US011268711B2

(12) United States Patent
Metzger et al.

(10) Patent No.: US 11,268,711 B2
(45) Date of Patent: *Mar. 8, 2022

(54) ELECTROSTATIC CHARGING AIR CLEANING DEVICE

(71) Applicant: Robert Bosch GmbH, Stuttgart (DE)

(72) Inventors: Michael Metzger, Sunnyvale, CA (US); Saravanan Kuppan, Sunnyvale, CA (US); Sondra Hellstrom, East Palo Alto, CA (US); Nathan Craig, Santa Clara, CA (US); Christina Johnston, Sunnyvale, CA (US); Jake Christensen, Elk Grove, CA (US)

(73) Assignee: Robert Bosch GmbH, Stuttgart (DE)

( * ) Notice: Subject to any disclaimer, the term of this patent is extended or adjusted under 35 U.S.C. 154(b) by 226 days.

This patent is subject to a terminal disclaimer.

(21) Appl. No.: 16/229,078

(22) Filed: Dec. 21, 2018

(65) Prior Publication Data

US 2020/0200408 A1 Jun. 25, 2020

(51) Int. Cl.
*F24F 3/16* (2021.01)
*F24F 8/192* (2021.01)
(Continued)

(52) U.S. Cl.
CPC ............ *F24F 8/192* (2021.01); *B01D 53/323* (2013.01); *F24F 13/28* (2013.01); *B01D 2221/16* (2013.01); *F24F 8/30* (2021.01)

(58) Field of Classification Search
CPC .... F24F 3/166; F24F 13/28; F24F 2003/1682; F24F 8/192; F24F 8/175; F24F 8/117;
(Continued)

(56) References Cited

U.S. PATENT DOCUMENTS 3,997,304 A 12/1976 Carr
4,357,150 A 11/1982 Masuda et al.
(Continued)

FOREIGN PATENT DOCUMENTS

KR 10-2017-0036903 A 4/2017

OTHER PUBLICATIONS

Chang et al., Corona Discharge Processes, Invited Review Paper, IEEE Transactions on Plasma Science, vol. 19, No. 6, Dec. 1991, pp. 1152-1166, Canada, 15 pages.
(Continued)

*Primary Examiner* — Xiuyu Tai
(74) *Attorney, Agent, or Firm* — Brooks Kushman P.C.

(57) ABSTRACT

An electrostatic charging air cleaning device having first and second pre-chargers. The first pre-charger is configured to generate a first corona discharge to electrostatically charge PM in the incoming air stream with a first charge to form a first exiting air stream exiting the first pre-charger. The second pre-charger is configured to generate a second corona discharge to electrostatically charge PM in the incoming air stream with a second charge to form a second exiting air stream exiting the second pre-charger. The device also includes a separator having apertures such that PM in the second exiting air stream passes through the separator to agglomerate with PM in the first exiting air stream to form agglomerated particles. The apertures are sized such that the agglomerated particles are larger than the apertures to preclude the agglomerated particles from reentering the second exiting air stream.

20 Claims, 2 Drawing Sheets

(51) Int. Cl.
*B01D 53/32* (2006.01)
*F24F 13/28* (2006.01)
*F24F 8/30* (2021.01)

(58) Field of Classification Search
CPC .... F24F 8/194; F24F 8/20; F24F 8/108; F24F 11/52; F24F 8/167; F24F 11/61; F24F 8/10; F24F 11/526; F24F 8/158; F24F 11/39; F24F 2110/50; F24F 8/30; B01D 53/323; B01D 2221/16; B01D 35/06; B01D 46/46; B01D 36/02; B01D 2255/00; B03C 3/12; B03C 3/368; B03C 3/74; B03C 3/08; B03C 3/41; B03C 3/47; B03C 3/68; B03C 3/09; B03C 3/38; B03C 3/017; B03C 3/34; B03C 3/155; B03C 2201/04; A61L 9/22; A61L 9/16; A61L 2209/16; Y02A 50/20; Y02B 30/70
See application file for complete search history.

(56) References Cited

U.S. PATENT DOCUMENTS

| | | | |
|---|---|---|---|
| 4,750,921 | A | 6/1988 | Sugita et al. |
| 4,781,736 | A | 11/1988 | Cheney et al. |
| 5,290,343 | A | 3/1994 | Morita et al. |
| 7,160,363 | B2 | 1/2007 | Kulmala et al. |
| 8,123,840 | B2 | 2/2012 | Marra |
| 9,101,941 | B2 | 8/2015 | Kim et al. |
| 10,707,492 | B2 | 7/2020 | Amin-Sanayei et al. |
| 2003/0005824 | A1 | 1/2003 | Katou et al. |
| 2005/0260118 | A1 | 11/2005 | Lu et al. |
| 2009/0152510 | A1 | 6/2009 | Ito |
| 2009/0213529 | A1 | 8/2009 | Gogotsi et al. |
| 2010/0304270 | A1 | 12/2010 | Amin-Sanayei et al. |
| 2014/0205495 | A1* | 7/2014 | Ota ............... B03C 3/368 422/4 |
| 2016/0332170 | A1* | 11/2016 | Wennerstrom .......... F24F 3/166 |
| 2019/0126176 | A1 | 5/2019 | Kaukopaasi et al. |

OTHER PUBLICATIONS

Zhou et al., Application of digital holographic microscopy and microfluidic chips to the measurement of particle size distribution of fly ash after a wet electrostatic precipitator, Flow Measurement and Instrumentation, pp. 24-29, China, Feb. 13, 2018, 6 pages.

Skalny et al., Mass spectrometric study of negative ions extracted from point to place negative corona discharge in ambient air at atmospheric pressure, International Journal of Mass Spectrometry, pp. 12-21, United Kingdom, Dec. 23, 2007, 10 pages.

Skalny et al., An analysis of mass spectrometric study of negative ions extracted from negative corona discharge in air, International Journal of Mass Spectrometry, pp. 317-324, United Kingdom, Jan. 7, 2004, 8 pages.

Molgaard et al., A New Clean Air Delivery Rate Test Applied to Five Portable Indoor Air Cleaners, Aerosol Science and Technology, pp. 408-417, Finland, Dec. 16, 2013, 10 pages.

Kim et al., A novel electrostatic precipitator-type small air purifier with a carbon fiber ionizer and an activated carbon fiber filter, Journal of Aerosol Science, pp. 63-73, Republic of Korea, Dec. 29, 2017, 11 pages.

Jaworek et al., Two-stage electrostatic precipitators for the reduction of PM2.5 particle emission, Progress in Energy and Combustion Science, pp. 206-233, Poland, Mar. 10, 2018, 28 pages.

Jaworek et al., Two-stage electrostatic precipitator with co- and counter-flow particle prechargers, Journal of Electrostatics, pp. 180-194, Poland, May 4, 2017, 15 pages.

He et al., Correlation of design parameters with performance for electrostatic precipitator. Part II. Design of experiment based on 3D FEM simulation, Applied Mathematical Modelling, 656-669, Singapore, Jul. 6, 2017, 14 pages.

He et al., Correlation of design parameters with performance for electrostatic precipitator. Part I. 3D model development and validation, Applied Mathematical Modelling, 633-655, Singapore, Jun. 1, 2017, 23 pages.

Hamra et al., Outdoor Particulate Matter Exposure and Lung Cancer: A Systematic Review and Meta-Analysis, Environmental Health Perspectives, vol. 122, No. 9, pp. 906-911, Sep. 2014, 8 pages.

* cited by examiner

ELECTROSTATIC CHARGING AIR CLEANING DEVICE

TECHNICAL FIELD

The present disclosure relates to an electrostatic charging air cleaning device, and in some embodiments, an electrostatic precipitation (ESP) air cleaning device without a collection electrode.

BACKGROUND

Non-limiting examples of typical air pollutants are particulate matter (PM) of different sizes, gases, volatile organic compounds (VOCs), bacteria and viruses, and odors. The size of particulate matter is typically measured by particles with x μm diameter (PMx), where x may be 2.5, 5, 10, etc. Examples of pollutant gases include, without limitation, $CO_2$, CO, $NO_x$ and $SO_x$. Examples of VOCs include, without limitation, methane, benzene, ethylene glycol, formaldehyde, methylene chloride, tetrachloroethylene, toluene, xylene, and 1,3-butadiene.

Many conventional technologies have been used for removing pollutants from the air. These technologies include high-efficiency particle arresting (HEPA) filtration, activated carbon filters, air ionizers, and electrostatic precipitators (ESP). Each of these technologies have strengths and weaknesses that make them more or less suitable for certain applications (e.g., indoor versus outdoor cleaning). Some of the characteristics commonly used to measure the performance of air cleaning technologies include clean air delivery rate (CADR) (in units of $m^3/h$), noise level (in dB), and costs per volume of air purified ($/m^3$).

HEPA filters are commonly utilized to purify air in homes, office buildings and car interiors. HEPA filters are relatively cost effective and efficient for removing PM with a minimum efficiency of 99.97% removal of PM0.3 and larger. However, HEPA filters have difficulties removing VOCs from air and certain gases, such as $NO_x$ and CO cannot be filtered. Moreover, bio fouling of the filter membranes may cause health risks. Additionally, clogging may lead to frequent filter replacement (about every six (6) months).

SUMMARY

According to one embodiment, an electrostatic charging air cleaning device is disclosed. The device includes first and second pre-chargers configured to receive an incoming air stream with particulate matter (PM). The first pre-charger is configured to generate a first corona discharge to electrostatically charge PM in the incoming air stream with a first charge to form a first exiting air stream exiting the first pre-charger. The second pre-charger is configured to generate a second corona discharge to electrostatically charge PM in the incoming air stream with a second charge to form a second exiting air stream exiting the second pre-charger. The first charge is opposite the second charge. The device further includes a charged divider configured to be charged with a voltage bias of a third charge, to attract PM with the second charge in the second exiting air stream and to repulse PM with the first charge in the first exiting air stream. The device also includes a separator having apertures such that PM in the second exiting air stream passes through the separator to agglomerate with PM in the first exiting air stream to form agglomerated particles. The apertures of the separator are sized such that the agglomerated particles are larger than the separator apertures to preclude the agglomerated particles from reentering the second exiting air stream.

According to another embodiment, an electrostatic charging air cleaning device is disclosed. The device includes first and second compartments. The device further includes first and second pre-chargers extending within a first region of the housing along a first direction and configured to receive an incoming air stream with particulate matter (PM) entering the housing. The first pre-charger is configured to generate a first corona discharge to electrostatically charge PM in the incoming air stream with a first charge to form a first exiting air stream exiting the first pre-charger and entering the first compartment. The second pre-charger is configured to generate a second corona discharge to electrostatically charge PM in the incoming air stream with a second charge to form a second exiting air stream exiting the second pre-charger and entering the second compartment. The first charge is opposite the second charge. The device further includes a charged divider and a separator situated between the first and second compartments and extending within a second region of the housing along a second direction. The charged divider is configured to be charged with a voltage bias of a third charge. The charged divider is further configured to attract PM with the second charge in the second exiting air stream and to repulse PM with the first charge in the first exiting air stream. The separator has apertures such that PM in the second exiting air stream passes through the separator to agglomerate with PM in the first exiting air stream to form agglomerated particles. The apertures of the separator are sized such that the agglomerated particles are larger than the separator apertures to preclude the agglomerated particles from reentering the second compartment.

In yet another embodiment, an electrostatic charging air cleaning device is disclosed. The device has a housing including an inlet and first, second and third compartments. The first and second compartments include first and second outlets, respectively. The device further includes first and second pre-chargers spaced apart from each other and extending within a first region of the housing along a first direction. The first and second pre-chargers are configured to receive an incoming air stream with particulate matter (PM) entering the inlet. The first pre-charger is configured to generate a first corona discharge to electrostatically charge PM in the incoming air stream with a first charge to form a first exiting air stream exiting the first pre-charger and entering the first compartment. The second pre-charger is configured to generate a second corona discharge to electrostatically charge PM in the incoming air stream with a second charge to form a second exiting air stream exiting the second pre-charger and entering the second compartment. The first charge is opposite the second charge. The device further includes a charged divider and a separator situated between the first and second compartments and extending within a second region of the housing along a second direction. The charged divider is configured to be charged with a voltage bias of a third charge. The charged divider is further configured to attract PM with the second charge in the second exiting air stream and to repulse PM with the first charge in the first exiting air stream. The separator has apertures such that PM in the second exiting air stream passes through the separator to agglomerate with PM in the first exiting air stream to form agglomerated particle. The apertures of the separator are sized such that the agglomerated particles are larger than the separator apertures to preclude the agglomerated particles from reentering the second compartment.

DETAILED DESCRIPTION

Figure 1:
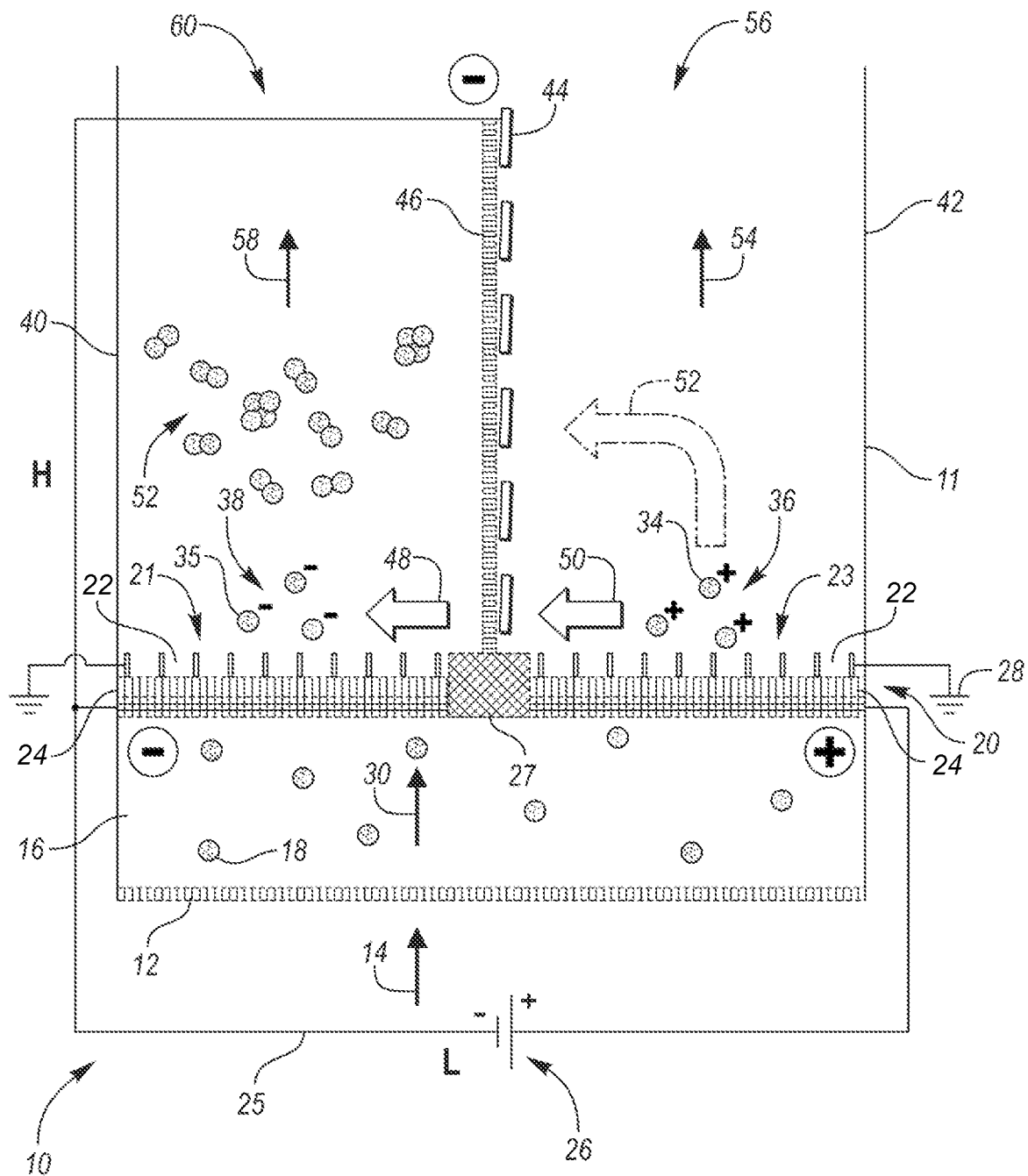
FIG. 1 is a schematic diagram of an electrostatic precipitation (ESP) air filter assembly according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

An emerging technology for air cleaning is electrostatic precipitation (ESP). ESP uses an ionization electrode (for example, one or more wires) to electrostatically charge particle suspended in an airflow. Subsequently, the trajectories of the charged particles are distorted by an induced electric field toward a collection electrode (for example, an electronically conducting collecting plate). The electrostatically adsorbed particles are trapped at the collection electrode, provided that a voltage bias is applied between the ionization electrode and the collection electrode. The trapped, adsorbed particles are consequently removed from the air stream using a collection electrode, for example. The collection electrode may be formed of a metal plate. The metal plate needs periodic maintenance, e.g., washing the collection electrode, in a frequency similar to filter replacement requirements for HEPA.

In light of the foregoing, what is needed is an electrostatic charging air cleaning system, such as an ESP, that does not include a collection electrode. What is also needed is a method for manufacturing an electrostatic charging air cleaning device that does not include a collection electrode.

FIG. 1 is a schematic diagram view of an electrostatic precipitation (ESP) filter assembly 10 according to an embodiment. In one embodiment, the ESP filter assembly 10 has a rectangular construction. The height and length dimensions of the ESP filter assembly 10 are depicted by the letters H and L on FIG. 1. The width of the ESP filter assembly 10 is coming into and out of the page showing FIG. 1. The height may be any one of the following values or within a range of any two of the following values: 10, 20, 50, 100, 200 and 500 cm. The length may be any one of the following values or within a range of any two of the following values: 5, 7, 10, 20, 30 and 50 cm. The width of the ESP filter assembly 10 may be any one of the following values or within a range of any two of the following values: 10, 20, 50, 100, 200 and 500 cm. The ESP filter assembly 10 may be housed in housing 11, which may be formed of plastic.

ESP filter assembly 10 includes pre-filter membrane 12. Pre-filter membrane 12 is configured to preclude large particles (e.g., dust particles) in an air stream 14 from entering the ESP filter assembly 10. The size of the large particles may be one of the following values or within a range of any two of the following values: PM100, PM50, PM10, PMS, PM2.5 or very large dust agglomerates. In one embodiment, the pre-filter membrane 12 is formed of a porous polypropylene material. The porosity of pre-filter membrane 12 may be one of the following values or within a range of any two of the following values: 20, 40, 60 and 80 percent.

After exiting pre-filter membrane 12, air stream 14 enters pre-filter chamber 16. Pre-filter chamber 16 is configured to collect particulate matter 18 within the air stream 14 before it enters pre-charger subassembly 20. The air within pre-filter chamber 16 may include particulate matter of PM2.5 and smaller. The concentration of particulate matter 18 within pre-filter chamber 16 may be one of the following values or within a range of any two of the following values:

40, 50, 60, 70, 80, 90, 100, 150, 200 and 300 µg/m³. The height of pre-filter chamber 16 may be one of the following values or within a range of any two of the following values: 1, 2, 5, 10, 20, 50 and 100 cm.

Pre-charger subassembly 20 is configured to electrostatically charge the particulate matter in the pre-filter chamber 16. In the embodiment shown in FIG. 1, pre-charger subassembly 20 includes first pre-charger 21, second pre-charger 23 and insulator 27. As shown in FIG. 1, first pre-charger 21 is situation on the left side of ESP filter assembly 10 and second pre-charger 23 is on the right side of ESP filter assembly 10. Insulator 27 divides first and second pre-charger assemblies 21 and 23. Insulator 27 may be formed of a dense, non-porous polymeric or ceramic materials, e.g., polytetrafluoroethylene (PTFE), perfluoroalkoxy (PFA), tetrafluorethylene-perfluoropropylene (FEP), polyvinyl chloride (PVC), polyoxymethylene (Delrin), silicone rubber, glass or porcelain (e.g., clay, quartz or alumina).

Figure 2:
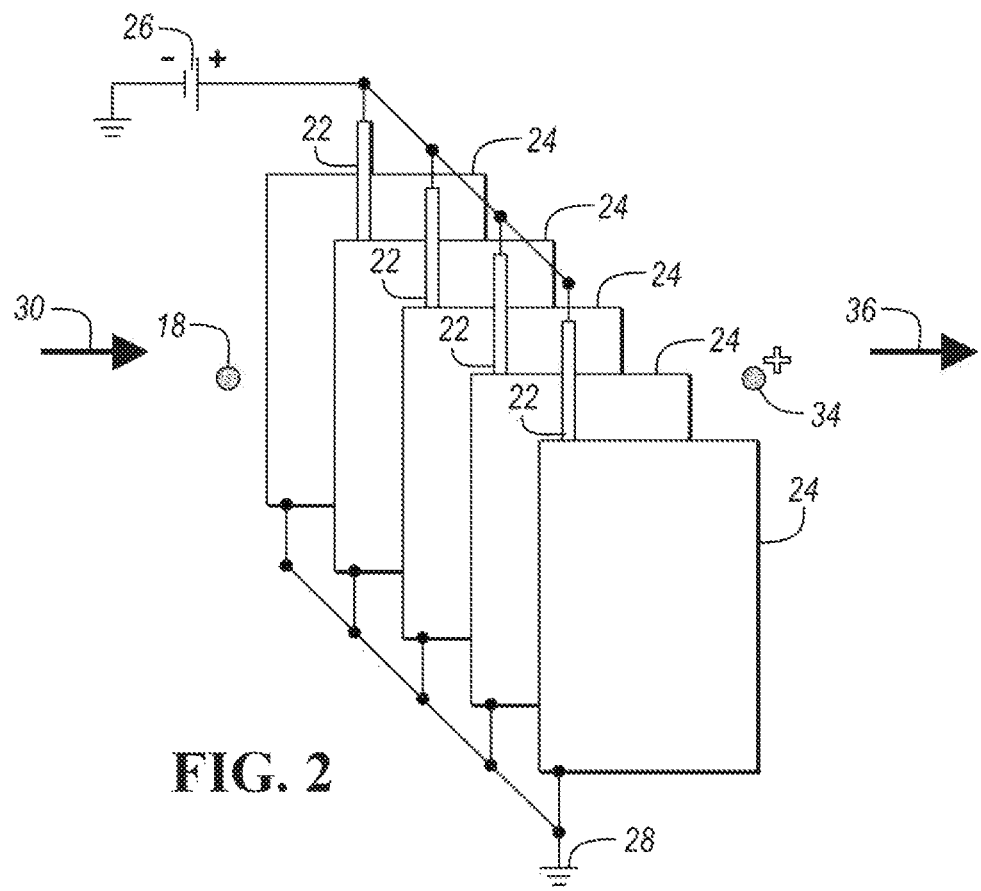
FIG. 2 depicts a perspective view of discharge electrodes dispersed between discharge plates according to an embodiment.

First and second pre-chargers 21 and 23 include discharge electrodes 22 and discharge plates 24. Discharge electrodes 22 of first and second pre-charger 21 and 23 are electrically connected to wiring 25. FIG. 2 depicts a perspective view of discharge electrodes 22 and discharge plates 24, which form a part of second pre-charger 23. In one embodiment, as shown in FIG. 2, each discharge electrode 22 is a wire and each discharge plate 24 is a rectangular plate. As shown in FIG. 2, each discharge electrode wire is adjacent to a pair of discharge plates 24. In one embodiment, plates 24 are parallel to each other and are parallel to the axis of the adjacent discharge electrode wire 22, which extends within the space created by the pair of adjacent discharge plates 24 along the axis of the adjacent discharge electrode wire 22 in a direction of the length of each plate 24. Each wire 22 may be equally spaced between the pair of adjacent plates 24. The spacing may be any one of the following values or within a range of any two of the following values: 10 µm, 50 µm, 100 µm, 500µ, 1 mm, 5 mm and 1 cm. As shown in FIG. 2, discharge electrodes 22 are connected in parallel to high voltage supply 26. The voltage applied to discharge electrodes 22 may be any one of the following values or within a range of any two of the following values: 1, 2, 5, 10, 20, 50 and 100 kV. As shown in FIGS. 1 and 2, discharge plates 24 are connected to ground 28.

Figure 3:
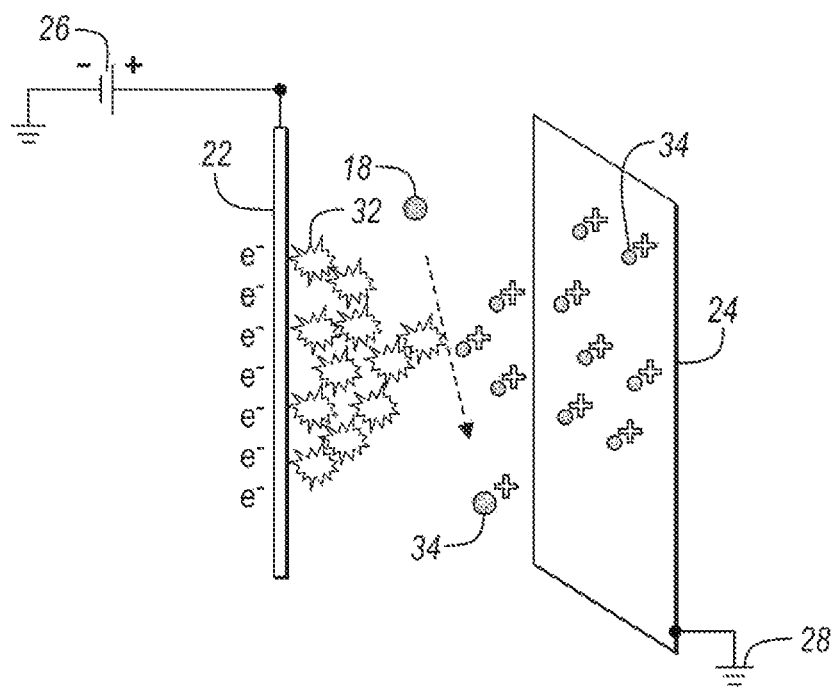
FIG. 3 is a perspective view of a discharge electrode and an adjacent discharge plate according to one embodiment.

As shown by air stream 30, polluted air with particulate matter 18 flows through discharge plates 24. Particulate matter 18 is not charged before entering the space between the discharge plates 24. The velocity of the particulate matter flowing between discharge plates 24 may be one of the following values or within a range of any two of the following values: 0.1, 0.5, 1, 2, 5, 10, 20, 50 and 100 m/s. An electric field between each discharge electrode 22 and pair of adjacent discharge plates creates a corona discharge 32, as shown in FIG. 3. FIG. 3 is a perspective view of a discharge electrode 22 and an adjacent discharge plate 24.

Particulate matter 18 entering second pre-charger 23 is charged by interaction with gaseous ions within the corona discharge 32 to obtain pre-charged particulate matter 34. The length of each of the discharge plates 24 may be relatively short to avoid precipitation of the pre-charged particulate matter 34. The length of the discharge plates 24 may be one of the following values or within a range of any two of the following values: 14, 16, 18, 20 and 22 µm. The length of the discharge electrodes 22 may be one of the following values or within a range of any two of the following values: 14, 16, 18, 20 and 22 µm.

As illustrated in FIG. 3 for corona discharge 32, an ionization principle of an electron avalanche forms pre-charged particulate matter 34. The type (e.g., negative or positive) of corona depends on the polarity of the discharge electrodes 22. By applying a positive corona, a separation of charge carriers in the electronic field occurs between a discharge electrode 22 and adjacent discharge plates 24 such that electrons go to the positive electrode (i.e., discharge plates 24) and gaseous ions are repelled. In a negative corona, the ions are attracted inward and the electrons are repelled outward.

As shown in FIG. 1, first pre-charger 21 is negatively charged and second pre-charger 23 is positively charged. Air stream 30 of particulate matter 18 is divided up into air stream 36 including pre-charged particulate matter 34 positively ionized by second pre-charger 23 and air stream 38 including pre-charged particulate matter 35 negatively ionized by first pre-charger 21. Air stream 38 including negatively charged particulate matter 35 exits first pre-charger 21 into first compartment 40. Air stream 36 including positively charged particulate matter 34 exits second pre-charger 23 into second compartment 42.

First and second compartments 40 and 42 are separated by charged divider 44 and separator 46. As shown in FIG. 1, charged divider 44 is adjacent to second compartment 42 and separator 46 is adjacent to first compartment 40. In one embodiment, charged divider 44 is formed of a mesh material such as a stainless steel mesh material. The mesh material may have a relatively large window size and a relatively low surface area to avoid significant particle precipitation. The window size may be one of the following values or within a range of any two of the following values: 100 µm, 200 µm, 500 µm, 1 mm, 2, mm, 5 mm and 1 cm. The surface area may be one of the following values or within a range of any two of the following values: 0.1, 0.2, 0.5, 1, 2, 5 and 10 cm² of surface area per cm² of geometric area. The porosity of the mesh material may be one of the following values or within a range of any two of the following values: 20, 30, 40, 50 and 60 percent. A negative voltage bias may be applied to charged divider 44 using negative charge delivered by high voltage supply 26 through wiring 25. The negative voltage bias applied to charged divider 44 is configured to repel negatively charged particles 35 from air stream 38 (as shown by arrow 48) and attract positively charged particles 34 from air stream 36 (as shown by arrow 50).

As shown in FIG. 1, separator 46 is oriented parallel to charged divider 44. Separator 46 is spaced apart from charged divider 44 by a distance. The distance may be one of the following values or within a range of any two of the following values: 1 µm, 10 µm, 100 µm, 200 µm, 500 µm and 1 mm. Separator 46 may be formed of polypropylene material. Separator 46 may be sized to function as a size selective membrane. In one embodiment, separator 46 includes apertures having nominal diameter of about 5 µm. The porosity of separator 46 may be one of the following values or within a range of any two of the following values: 50, 55, 60, 65 and 70 percent. The sizing and porosity may be selected to permit positively charged PM2.5 particles to pass through when accelerated toward charged divider 44, along trajectory 52, for example. After positively charged PM particles in air stream 36 pass through separator 46, the positively charged PM particles recombine with negatively charged PM particles 35 in air stream 38 due to charge neutrality to form agglomerated particles 52. The diameter of agglomerated particles 52 may be greater than or equal to 5 µm. Agglomerated particles 52 are sized such that the diameters are larger than the diameter of the apertures of separator 46. Accordingly, agglomerated particles 52 are prevented from exiting first compartment 40 through separator 46 and entering second compartment 42.

ESP filter assembly 10 may function as an electrostatic agglomerator that separates a clean air stream from a PM waste stream by a size selective separator. Clean air stream 54 exits second compartment 42 through outlet 56 opposite second pre-charger 23. Waste air stream 58 exits first compartment 40 through outlet 60 opposite first pre-charger 21.

As shown in FIG. 1, ESP filter assembly 10 is oriented such that pre-filter chamber 16 is situated below first and second compartments 40 and 42. In this orientation, ESP filter assembly may be supported on a structure that includes a manifold configured to intake polluted air stream 14 and deliver polluted air stream 14 to pre-filter membrane 12 and pre-filter chamber 16. In this embodiment, first and second compartments 40 and 42 are oriented such that outlets 56 and 60 are situated furthest away from pre-filter membrane 12 (e.g., located at a top portion of ESP filter assembly). In another embodiment, pre-filter chamber 16 may be arranged side-to-side with compartments 40 and 42. In this embodiment, one of compartments 40 and 42 is a lower compartment and the other compartment is an upper compartment. In one or more embodiments, waste outlet 60 is vented to a collection bin (not shown) to collect agglomerated particles 52.

The following application is related to the present application: U.S. patent application Ser. No. 16/229,164, filed on Dec. 21, 2018, which is incorporated by reference in its entirety herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electrostatic charging air cleaning device comprising:
    a first pre-charger configured to generate a first corona discharge to electrostatically charge a particulate matter in an incoming air stream with a first charge to form a first exiting air stream exiting the first pre-charger;
    a second pre-charger configured to generate a second corona discharge to electrostatically charge the particulate matter in the incoming air stream with a second charge to form a second exiting air stream exiting the second pre-charger, and the first charge being opposite the second charge;
    a charged divider configured to be charged with a voltage bias of the first charge or the second charge, the charged divider including apertures having a first porosity in a first range of 20 to 40 percent; and
    a separator including apertures having a second porosity in a second range of 50 to 70 percent such that the particulate matter in the second exiting air stream passes through the separator to agglomerate with the particulate matter in the first exiting air stream to form agglomerated particles precluded from reentering the second exiting air stream through the apertures of the separator.

2. The electrostatic charging air cleaning device of claim 1, wherein the separator is closer to the first pre-charger than the second pre-charger and the charged divider is closer to the second pre-charger than the first pre-charger.

3. The electrostatic charging air cleaning device of claim 1, further comprising an insulator situated between the first and second pre-chargers and the charged divider or the separator.

4. The electrostatic charging air cleaning device of claim 1, wherein the charged divider is formed of a metal mesh material.

5. The electrostatic charging air cleaning device of claim 1, wherein the separator is formed of a polypropylene material.

6. The electrostatic charging air cleaning device of claim 1, wherein the first and second pre-chargers are wire-plate first and second pre-chargers.

7. The electrostatic charging air cleaning device of claim 1, further comprising a waste outlet configured to outlet an air stream including the agglomerated particles.

8. An electrostatic charging air cleaning device comprising:
    a housing including first and second compartments;
    first and second pre-chargers extending along a first longitudinal direction aligned with a direction of an incoming air stream and configured to receive the incoming air stream with a particulate matter entering the housing, the first pre-chargers including a first plurality of discharge plates spaced apart from one another, the second pre-chargers including a second plurality of discharge plates spaced apart from one another, the first and second pluralities of discharge plates are aligned side-by-side, the first pre-charger configured to generate a first corona discharge to electrostatically charge the particulate matter in the incoming air stream with a first charge to form a first exiting air stream exiting the first pre-charger and entering the first compartment, the second pre-charger configured to generate a second corona discharge to electrostatically charge the particulate matter in the incoming air stream with a second charge to form a second exiting air stream exiting the second pre-charger and entering the second compartment, and the first charge being opposite the second charge; and
    a charged divider and a separator situated between the first and second compartments and extending along a second longitudinal direction, the charged divider configured to be charged with a voltage bias of the first charge or the second charge, the charged divider including apertures, the separator having apertures such that the particulate matter in the second exiting air stream passes through the separator to agglomerate with the particulate matter in the first exiting air stream to form agglomerated particles precluded from reentering the second compartment through the apertures of the separator.

9. The electrostatic charging air cleaning device of claim 8, wherein the charged divider is adjacent the second compartment and the separator is adjacent the first compartment.

10. The electrostatic charging air cleaning device of claim 8, wherein the separator is closer to the first pre-charger than the second pre-charger and the charged divider is closer to the second pre-charger than the first pre-charger.

11. The electrostatic charging air cleaning device of claim 8, wherein the charged divider is formed of a metal mesh material.

12. The electrostatic charging air cleaning device of claim 8, wherein the separator is formed of a polypropylene material.

13. The electrostatic charging air cleaning device of claim 8, further comprising an insulator situated between the first and second pre-chargers, the charged divider and the separator extend away from the insulator along the second direction.

14. The electrostatic charging air cleaning device of claim 8, wherein the charged divider and the separator extend between the first and second pre-chargers and the first and second outlets along the second longitudinal direction.

15. An electrostatic charging air cleaning device comprising:
  a housing including an inlet and first, second and third compartments, the first and second compartments including first and second outlets, respectively;
  first and second pre-chargers spaced apart from each other along a first longitudinal direction and configured to receive an incoming air stream with a particulate matter entering the inlet, the first pre-charger configured to generate a first corona discharge to electrostatically charge the particulate matter in the incoming air stream with a first charge to form a first exiting air stream exiting the first pre-charger and entering the first compartment, the second pre-charger configured to generate a second corona discharge to electrostatically charge the particulate matter in the incoming air stream with a second charge to form a second exiting air stream exiting the second pre-charger and entering the second compartment, the first charge being opposite the second charge, and the third compartment is situated between the first and second pre-chargers and the inlet; and
  a charged divider and a separator situated between the first and second compartments and extending between the first and second pre-chargers and the first and second outlets along a second longitudinal direction different than the first longitudinal direction, the charged divider configured to be charged with a voltage bias of the first charge or the second charge, the charged divider including apertures, the separator having apertures such that the particulate matter in the second exiting air stream passes through the separator to agglomerate with the particulate matter in the first exiting air stream to form agglomerated particles precluded from reentering the second compartment through the apertures of the separator.

16. The electrostatic charging air cleaning device of claim 15, wherein an insulator is situated between the first and second pre-chargers.

17. The electrostatic charging air cleaning device of claim 15, further comprising a pre-filter situated in the inlet.

18. The electrostatic charging air cleaning device of claim 15, further comprising an insulator configured to insulate the first pre-charger, the second pre-charger, and the charged divider from each other.

19. The electrostatic charging air cleaning device of claim 15, wherein the first outlet is configured to outlet the agglomerated particles from the first compartment.

20. The electrostatic charging air cleaning device of claim 15, wherein the second outlet is configured to outlet an air stream substantially excluding PM2.5 or higher.

* * * * *